United States Patent Office 3,326,660
Patented June 20, 1967

3,326,660
PYRIDAZONES AND METHOD FOR CONTROLLING VEGETATION
Franz Reicheneder, Ludwigshafen (Rhine), Germany, and Karl Dury, deceased, late of Kirchheimbolanden, Germany, by Johanna Maria Dury, heiress-at-law, Kirchheimbolanden, Germany, and Adolf Fischer, Mutterstadt, Pfalz, Germany, assignors to Badische Anilin- & Soda-Fabrik Aktiengesellschaft, Ludwigshafen (Rhine), Germany
No Drawing. Filed Feb. 2, 1965, Ser. No. 429,879
Claims priority, application Germany, Feb. 12, 1964,
B 75,382
3 Claims. (Cl. 71—2.5)

The present invention relates to pyridazone derivatives, particularly 4,5-dihydroxypyridazone derivatives. These substances have a good herbicidal action, particularly for the complete destruction of unwanted growth. The active substances have only a short residual life in the soil.

It is known that pyridazone derivatives, for example 1-phenyl-4-methoxy-5-chloropyridazone-(6), may be used for controlling weeds (British patent specification No. 917,849). The activity of this compound is however not satisfactory.

We have found that pyridazones having the formula

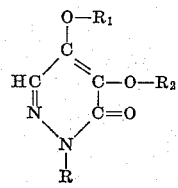

in which R denotes the cylohexyl radical, the phenyl radical or a phenyl radical bearing a methyl radical as substituent, $R_1$ denotes an alkyl radical having one to three carbon atoms, a hydrogen atom or an acyl radical and $R_2$ denotes an alkyl radical having one to three carbon atoms, a hydrogen atom or an acyl radical, have a considerable herbicidal action. By acyl radical we understand the radical of a carboxylic acid which may bear as substituents chlorine or halogenated phenoxy or alkylphenoxy radical. Examples of such carboxylic acids are: acetic acid, monochloroacetic acid, trichloroacetic acid, dichloropropopionic acid, dichlorobutyric acid, dichlorophenoxyacetic acid, chloromethylphenoxyacetic acid, oxalic acid, benzoic acid and chlorobenzoic acid.

The particular advantage of these derivatives over the prior art pyridazone derivatives lies in their considerably better herbicidal initial and total action, particularly against tares, goosegrass, orchard grass and slender foxtail. They are suitable for total destruction of vegetation on farmland, roads, pathways, and open spaces. The rate of application is about 1 to 10 kg. of active substance per hectare.

The scope of application of the agents according to this invention may be varied by adding substances having bactericidal or fungicidal action or plant growth regulators and also by admixture with fertilizers.

The compounds may be prepared for example by reacting 1-phenyl-4,5-dichloropyridazone-(6) with 2 moles of an alcoholate. 1-phenyl-4,5-dimethoxypyridazone-(6) is formed in this way with sodium methylate. The other compounds are prepared in a corresponding manner. Another possible method of production is the reaction of 1-phenyl-4,5-dihydroxypyridazone-(6) with 2 moles of an acid chloride. 1-phenyl-4,5-diacetoxypyridazone-(6) is formed in this way with acetyl chloride. The other compounds are prepared in an analogous way.

As examples of active substances in accordance with this invention, compounds having the general formula

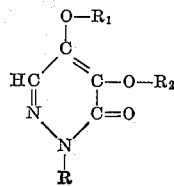

may be given in which R, $R_1$ and $R_2$ have the meanings given in the following list, which also gives the melting point (M.Pt.) in °C:

| R | $R_1$ | $R_2$ | M.P. |
|---|---|---|---|
| ⬡—H | —CH₃ | —CH₃ | 60 to 61. |
| ⬡— | —CH₃ | —CH₃ | 144. |
| H₃C—⬡— | —CH₃ | —CH₃ | 95 to 96. |
| ⬡— | —C₂H₅ | —C₂H₅ | 79 to 80. |
| ⬡— | —C₂H₅ | —CH₃ | 96 to 97. |
| ⬡— | —CO—CH₃ | —CH₃ | 117 to 118. |
| ⬡— | —H | —CH₃ | 178 to 179. |
| ⬡— | —CO—C(CH₃)₂—C₂H₅ | —CH₃ | 81 to 82. |
| ⬡— | —CO—CH(Cl)—CH₃ | —CH₃ | 91 to 92. |

| R | R₁ | R₂ | M.P. |
|---|---|---|---|
| phenyl | $-CO-\text{(2,4-dichlorophenyl)}$ | $CH_3$ | 121 to 123. |
| phenyl | $-CO-CH_2-O-\text{(3-chloro-4-methylphenyl)}$ | $-CH_3$ | 136 to 137. |

The agents according to this invention for controlling unwanted vegetation may be applied in the form of solutions, emulsions, suspensions or dusts. The form of application depends on the intended use. All forms of application should ensure a fine division of the active substance. Particularly in the case of total destruction of vegetation, the effect can be enhanced by the use of phytotoxic carriers, as for example high-boiling mineral oil fractions or chlorohydrocarbons. Solvents, for example alcohols, such as ethanol or isopropanol, ketones, for example acetone or cyclohexanone, aliphatic hydrocarbons, for example gasoline fractions, cyclic hydrocarbons, for example benzene, toluene, xylene, tertahydronaphthalene, or alkylated naphthalenes, chlorinated hydrocarbons, for example trichloroethylene, mineral or vegetable oils or sulfoxides, for example dimethyl sulfoxide, sulfones, for example sulfolan, or amides, for example dimethylformamide or N-methylpyrrolidone, may be used for the preparation of the solutions.

Aqueous forms of application are preferably emulsions and dispersions. The substances, alone or in one of the above-mentioned solvents, are finely dispersed in water, preferably by means of a wetting or dispersing agent. A concentrate may also be prepared from the active substance, emulsifier or dispersant and any solvent used, the concentrate being diluted with water prior to use.

Dust compositions may be prepared by mixing or common grinding of the active substance with a solid carrier. Suitable carriers are diatomaceous earth, talc, kaolin, calcium carbonate, bentonite, boric acid, tricalcium phosphate, or wood flour, cork meal and carbon or other materials of vegetable origin. Alternatively the substances may be applied to the carriers by means of a volatile solvent or the carriers may be impregnated with a solution of the active substance in a volatile solvent. Powdered formulations or pastes may be prepared by adding wetting agents or protective colloids; these may be suspended in water and may then be used as sprays.

The various forms of application may be made more suitable for the particular purpose by adding substances which improve the dispersion, the adhesion, the resistance to rain and if desired the penetrability, for example fatty acids, resins, wetting agents, glue, casein or alginates.

The following examples illustrate the use of the agents.

Example 1

Mustard (*Sinapis alba*), wild oats (*Avena fatua*), slender foxtail (*Alopecurus myosuroides*), orchard grass (*Dactylis glomerata*), annual meadowgrass (*Poa annua*), tares (Vicia spp.), goosegrass (*Galium aparine*), white goosefoot (*Chenopodium album*), chickweed (*Stellaria media*), knotweed (Polygonum spp.), mercury (Mercurialis spp.), sorrel (Rumex spp.) and small nettle (*Urtica ureans*) are sown in plastic pots having a diameter of 8 cm. in the greenhouse and sprayed on the same day with 1-phenyl-4,5-dimethoxypyridazone-(6) (I) and, for comparison, 1-phenyl-4-amino-5-chloropyridazone-(6) (II) and 1-phenyl-4-methoxy-5-chloropyridazone-(6) (III), each at a rate of application equivalent to using 2 kg. of active substance per hectare dispersed with the addition of sodium lignin sulfonate in an amount of water equivalent to 500 liters per hectare.

Two weeks later it is found that 1-phenyl-4,5-dimethoxypyridazone-(6) (I) has a better herbicidal action, particularly in the case of tares (Vicia spp.), goosegrass (*Galium aparine*), orchard grass (*Dactylis glomerata*) and slender foxtail (*Alopecurus myosuroides*), than 1-phenyl-4-amino-5-chloropyridazone-(6) (II) and 1-phenyl-4-methoxy-5-chloropyridazone-(6) (III). The results of the experiment are contained in the following table. 0 denotes no damage, 100 denotes total destruction.

|  | Active substance | | |
|---|---|---|---|
|  | I | II | III |
| Mustard | 100 | 60 to 70 | 70 to 80. |
| Wild oats | 80 to 90 | 20 to 30 | 30 to 40. |
| Slender foxtail | 100 | 40 to 60 | 50. |
| Orchard grass | 100 | 40 to 50 | 40. |
| Annual meadowgrass | 100 | 60 | 50. |
| Tares | 100 | 50 to 60 | 60. |
| Goosegrass | 90 to 100 | 50 | 50. |
| White goosefoot | 100 | 80 to 90 | 80. |
| Chickweed | 100 | 80 | 70. |
| Knotweed | 100 | 80 to 90 | 90. |
| Mercury | 100 | 80 | 60 to 70. |
| Sorrel | 100 | 80 | 60 to 70. |
| Small nettle | 100 | 80 to 90 | 80. |

Example 2

Mustard (*Sinapis alba*), wild oats (*Avena fatua*), slender foxtail (*Alopecurus myosuroides*), orchard grass (*Dactylis glomerata*), annual meadowgrass (*Poa annua*), white goosefoot (*Chenopodium album*), chickweed (*Stellaria media*), knotweed (Polygonum spp.), goosegrass (*Galium aparine*), tares (Vicia spp.), mercury (Mercurialis spp.), sorrel (Rumex spp.) and small nettle (*Urtica urens*) in a green house are sprayed at a growth height of 6 to 20 cm. with 1-phenyl-4,5-dimethoxypyridazone-(6) at a rate corresponding to the use of 4 kg. of active substance per hectare dispersed with sodium lignin sulfonate in an amount of water equivalent to 500 liters of water per hectare. Three weeks later it is found that almost all the plants have completely withered.

The following table contains the results of the experiment, 0 denoting no damage and 100 denotes complete destruction:

| | |
|---|---|
| Mustard | 100 |
| Wild oats | 90 to 100 |
| Slender foxtail | 90 to 100 |
| Orchard grass | 100 |
| Annual meadowgrass | 90 to 100 |
| White goosefoot | 100 |
| Chickweed | 100 |
| Knotweed | 80 to 100 |
| Goosegrass | 70 to 90 |
| Tares | 80 to 90 |
| Mercury | 80 to 100 |
| Sorrel | 100 |
| Small nettle | 100 |

The other active substances given in the above list have a similar action to those used in Examples 1 and 2.

We claim:
1. A compound having the general formula

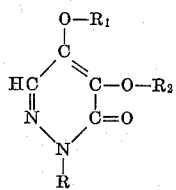

in which R denotes a member selected from the group consisting of cyclohexyl, phenyl and methyl substituted phenyl, $R_1$ denotes a member selected from the group consisting of alkyl having one to three carbon atoms, atom and acyl selected from the group consisting of alkanoyl of 2 to 6 carbon atoms, chloro substituted alkanoyl of 2 to 6 carbon atoms, phenoxyacetyl, methyl substituted phenoxyacetyl, chloro substituted phenoxyacetyl, benzoyl, and chloro substituted benzoyl, and $R_2$ denotes a member selected from the group consisting of alkyl having one to three carbon atoms, hydrogen and acyl selected from the group consisting of alkanoyl of 2 to 6 carbon atoms, chloro substituted alkanoyl of 2 to 6 carbon atoms, phenoxyacetyl, methyl substituted phenoxyacetyl, chloro substituted phenoxyacetyl, benzoyl, and chloro substituted benzoyl.

2. A method of controlling vegetation which comprises allowing a compound as claimed in claim 1 to act on the vegetation or on the soil in which it is growing or is to grow.

3. 1-phenyl-4,5-dimethoxypyridazone-(6).

References Cited

Hackh's Chemical Dictionary, page 18, Third Edition (1944).

NICHOLAS S. RIZZO, *Primary Examiner.*